United States Patent [19]

Rosenthal et al.

[11] Patent Number: 5,938,977
[45] Date of Patent: Aug. 17, 1999

[54] STABILIZER COMPOSITION FOR THERMOPLASTIC RESIN COMPOSITIONS

[75] Inventors: Michael Rosenthal, Munich; Walter Reith, Eggenhofen; Stefan Forster, Dachau, all of Germany

[73] Assignee: Baerlocher GmbH, Munich, Germany

[21] Appl. No.: 08/955,996

[22] Filed: Oct. 22, 1997

[30] Foreign Application Priority Data

Oct. 23, 1996 [DE] Germany .............................. 196 44 129

[51] Int. Cl.$^6$ .......................... C08K 15/32; C09K 15/22; C09K 15/06
[52] U.S. Cl. ...................... 252/400.61; 252/403; 252/407
[58] Field of Search ........................... 252/400.2, 400.52, 252/400.61, 403, 407

[56] References Cited

U.S. PATENT DOCUMENTS

| 4,427,816 | 1/1984 | Aoki et al. .............................. 524/357 |
| 5,534,566 | 7/1996 | Wehner et al. ........................... 524/27 |
| 5,859,102 | 1/1999 | Pfaendner et al. ...................... 524/117 |

*Primary Examiner*—Kriellion S. Morgan
*Attorney, Agent, or Firm*—Scully, Scott, Murphy & Presser

[57] ABSTRACT

The present invention relates to a stabilizer composition for weather-resistant halogen-containing thermoplastic resin compositions, in particular based on PVC. The stabilizer composition according to the invention contains at least one natural or synthetic hydrotalcite, at least one basic calcium-aluminum-hydroxy compound, selected from basic calcium-aluminum-hydroxy-phosphites and basic calcium-aluminum-hydroxy-carboxylates, and at least one polyol and/or at least one hydroxy group-containing isocyanurate.

6 Claims, No Drawings

STABILIZER COMPOSITION FOR THERMOPLASTIC RESIN COMPOSITIONS

The present invention relates to a stabilizer composition for weather-resistant halogen-containing thermoplastic resin compositions based, particularly, on polyvinyl chloride (PVC).

Halogen-containing polymers are subject to chemical decomposition reactions which are caused by the action of UV radiation, light and/or heat and which lead to lasting impairments of the use characteristics. In particular, extruded PVC moldings tend to decompose upon irradiation or the application of heat and under the action of water, such decomposition reactions being, above all, detrimental to paints. To prevent such undesired long-term decomposition reactions of the PVC polymer chains, so-called stabilizers have been integrated into the thermoplastic polymer compositions since a long time.

Stabilizers which contain heavy metals are normally used in the production of molded articles from rigid PVC for outdoor applications, for instance window sections, pipes and plates, because of the high demands which are made on the molded articles with respect to the weatherability thereof, and on account of the good stabilizing characteristics of said stabilizers. Since heavy metals, such as cadmium or lead, are less and less used for reasons of industrial hygiene and for environmental reasons, attempts have been made to replace said stabilizers in halogen-containing polymers more and more by physiologically harmless stabilizing systems based on calcium or zinc compounds. These so-called Ca/Zn stabilizers, however, show a tendency towards strong chalking when exposed to outdoor weather and often effect a conspicuous yellow staining in molded bodies made therefrom after prolonged weather exposure.

Therefore, the known Ca/Zn stabilizer systems are not adequate, in particular, for white rigid PVC moldings for outdoor applications, for instance PVC window sections, with respect to weather resistance, light stability and surface quality.

As is known from EP-B-424572, the weather resistance of rigid PVC moldings which are free from lead and cadmium is improved by the partial replacement of $TiO_2$ by ZnS. However, the content of heavy metals in the PVC molding compound is increased by the use of such a combination.

Moreover, DE-C-3019632 discloses the use of hydrotalcites represented by the formula $Mg_{1-x}Al_x(OH)_2A_{x/n}^{n-}\cdot mH_2O$ for inhibiting the thermal ultraviolet decomposition of thermoplastic resins. However, it has been found that the hydrotalcites known from DE-C-3019632 do not exhibit the desired quality as regards their stabilization characteristics, above all their weatherability.

Other stabilizer compositions of the hydrotalcite type, for instance those described in EP-B-189899 as $[(M_1^{2+})_{y1}(M_2^{2+})_{y2}]_{1-x}M_x^{3+}(OH)_2A_{x/n}^{n-}\cdot mH_2O$, satisfy the high demands made on the weatherability of the molded articles either not at all or only insufficiently.

DE-C-3843581 discloses a halogen-containing thermoplastic resin composition which contains a metal soap, an ethylene/vinylacetate-copolymer hydrolysate and a hydrotalcite as the stabilizer composition.

As is generally known, PVC molding compositions including hydrotalcites as stabilizers tend to form bubbles during processing because of released $CO_2$ and/or because of crystallization water. Such bubbling leads to problems in the making of molded bodies and in the further processing and/or use thereof.

It is known from EP-B-256872 that, when hydrotalcites are used, magnesium oxide can be employed for preventing bubbling. However, bubbling is hardly prevented by the use of magnesium oxide. Moreover, it is known from EP-A-432495 that the bubbling in the case of hydrotalcite formulations can be reduced by drying the hydrotalcite at elevated temperatures and by subsequent melting in hydrophobing agents. However, the crystal structure of the hydrotalcite is damaged by this method and the stabilizing effect is thereby impaired.

It is the object of the present invention to provide a stabilizer composition for halogen-containing thermoplastic resins which in comparison with known formulations exhibits a high long-term weatherability, good color fastness and hardly any bubbling during processing and which is preferably suited for use in rigid PVC for outdoor applications, e.g. for window sections.

This object is achieved according to the invention by a stabilizer composition for halogen-containing thermoplastic resins, comprising
 (a) at least one natural or synthetic hydrotalcite which is optionally surface-modified, and
 (b) at least one basic calcium-aluminum-hydroxy compound, selected from
  (b1) basic calcium-aluminum-hydroxy-phosphites represented by the general formula (I)

$$Ca_xAl_2(OH)_{2(x+3-y)}(HPO_3)_y \cdot mH_2O \qquad (I)$$

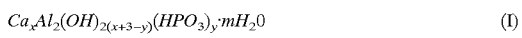

wherein
  $2 \leq x \leq 12$,
  $2x+5/2 > y > 0$, and
  $0 \leq m \leq 12$
  except for $y=1$, when $2 \leq x \leq 8$;
 and/or
 (b2) basic calcium-aluminum-hydroxy-carboxylates represented by the general formula (II)

$$Ca_xAl_2(OH)_{[2(x+6)-y]}A_{y/n}^{n-} \cdot mH_2O \qquad (II)$$

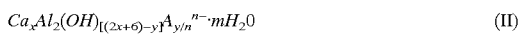

wherein
  $2 \leq x \leq 12$
  $2x+5/2 > y > 0$
  $0 \leq m \leq 12$,
  $1 \leq n \leq 8$, and
 $A^{-n}$ is an aliphatic saturated, unsaturated, straight-chain or branched mono- or polyfunctional carboxylic acid anion having 1 to 22 carbon atoms or an aromatic or heteroaromatic mono- or polyfunctional carboxylic acid anion having 6 to 20 carbon atoms or combinations thereof, except for $y=1$ when $2 \leq x \leq 8$; and
 (c) at least one polyol and/or at least one hydroxyl group-containing isocyanurate;
wherein the stabilizer composition does not contain ethylene/vinylacetate-copolymer hydrolysate.

The stabilizer composition according to the invention is preferably used for polyvinyl chloride (PVC) as the halogen-containing thermoplastic resin.

The term polyvinyl chloride as used in the present invention covers standard homopolymers or copolymers of vinyl chloride and also mixtures of such polyvinyl chloride compounds with other polymer compositions. Such polymers may have been produced in any desired way, for instance by suspension, emulsion or block polymerization. Their K value may, for instance, range between 50 and 100.

It has been found that rigid PVC moldings for outdoor applications which show an unexpectedly good light stability and long-term weather resistance can be produced by using the stabilizer composition of the invention. The stabilizer composition of the invention shows hardly any deviation of the colors from the initial color values after an outdoor weather exposure for three years. Moreover, not only the weather exposure characteristics are improved, but bubbling is surprisingly minimized during extrusion as well.

Hydrotalcites are, for instance, described in DE-A-4425266, EP-A-0189899, DE-A-3843581, U.S. Pat. No.

4,883,533, EP-A-0407139, DE-A-4031818, DE-A-4110835, DE-A-4117034, EP-A-0522810, DE-A-4439934, and U.S. Pat. No. 5,352,723; compounds represented by the general formula (I) are, e.g., described in DE-A-4106411, and compounds represented by the general formula (II) are, for instance, known from DE-A-4106404.

The carboxylic acid anion $A^{n-}$ contained in the general formula (II) can, for instance, be selected from anions of malonic acid, succinic acid, adipic acid, fumaric acid, maleinic acid, phthalic acid, isophthalic acid, terephthalic acid, pyridinic acid, benzoic acid, salicylic acid, tartronic acid, malic acid, tartaric acid, acetonedicarboxylic acid, oxalacetic acid, aconitic acid, citric acid and amino acid. The anions of fumaric acid and phthalic acid are preferred; fumarates are particularly used.

Polyols which can be used in the stabilizer composition according to the invention are, for instance, polyols having 2 to 32 C atoms and 2 to 12 hydroxyl groups. Propylene glycol, neopentyl glycol, xylite, mannite, sorbite, trimethylol propane, pentaerythrite, dipentaerythrite and tripentaerythrite can preferably be used. Trimethylol propane and dipentaerythrite are particularly preferred.

The hydroxyl group-containing isocyanurate can be selected from compounds represented by the general formula (III)

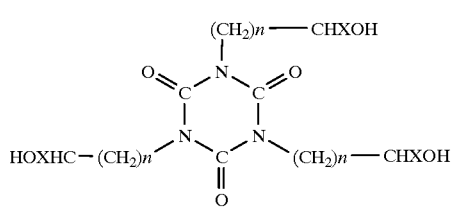

wherein groups X and indices n are respectively the same or different, and n is an integer from 0 to 5, preferably from 0 to 3, and X represents a hydrogen atom or a straight-chain or branched alkyl group having 1 to 6, preferably 1 or 2 carbon atoms, wherein at least one index is n≠0. Preferably, all X and n have the same meaning. Tris-(2-hydroxyethyl) isocyanurate is preferably used.

Component (a), i.e. hydrotalcite, is preferably used in an amount of from 0.01 to 2 parts by weight, in particular in an amount of from 0.1 to 1 part by weight, based on 100 parts by weight of the halogen-containing thermoplastic resin.

The amount of component (b) is preferably 0.01 to 2 parts by weight, in particular 0.1 to 1 part by weight, based on 100 parts by weight of the halogen-containing thermoplastic resin.

Component (c) is preferably used in an amount of from 0.01 to 2.5 parts by weight, in particular in an amount of from 0.05 to 1 part by weight, based on 100 parts by weight of the halogen-containing thermoplastic resin.

The stabilizer composition according to the invention can be present in any desired physical form, for instance as a powder mixture, as pellets, spray granules or microgranules, flakes or pastilles. These product forms may be made either from powder mixtures, pellets produced by the application of pressure and/or temperature, build-up granules made by using granulating aids, or by cooling melts of the inventive composition to form flakes or pastilles or by spraying. For the preparation of halogen-containing thermoplastic molding compositions of resin, in particular PVC molding compositions, the individual substances may be added directly or as a mixed product in the form of a powder mixture or as a melt product or as pellets to a resin mixture serving as a starting material. The halogen-containing thermoplastic molding composition of resin can then be formed into molded bodies in a manner which is known per se.

The stabilizer composition according to the invention may be combined with further heat and light stabilizers and with antioxidants. Such compounds, which are normally used as additives for halogen-containing thermoplastic resins, are, for instance, oxides and/or hydroxides of metals, such as calcium hydroxide or zinc oxide; zeolites or tin-containing stabilizers. Furthermore, organic stabilizers, such as 1,3-diketones or the metal salts thereof, dihydropyridines, epoxides and phosphites and/or inorganic stabilizers, such as garnets, modified hydrotalcites or other layer compounds, may be used.

The stabilizer compositions according to the invention can be used in combination with normally used additives, such as fillers (e.g. chalk, kaolinite), pigments (such as titanium dioxide, zinc sulfide), flameproofing agents (such as magnesium hydroxide, aluminum hydroxide, antimony trioxide), reinforcing agents (e.g. glass fibers, talcum) and plasticizers (e.g. phthalate, phosphate, polymer plasticizers, chlorinated paraffins) in the preparation of thermoplastic molding compositions.

For setting the rheogical requirements, lubricants such as paraffin waxes, low-molecular polyolefins, ester lubricants of mono- or polyvalent alcohols and mono- or dicarboxylic acids or amide waxes may be added to the halogen-containing thermoplastic resins.

Moreover, further additives, such as antioxidants, optical brightening agents, UV and light stabilizers, such as sterically hindered amines, and sulfur-containing compounds, in particular the sulfur-containing organic compounds, which are used for producing tin-containing stabilizers, may be added to the halogen-containing thermoplastic resins.

The following examples which are described in formulation tables 1 and 2 will explain the invention. Comparative formulations are designated by VB and inventive formulations by B in the tables. In the examples the weather resistance and light stability of molded PVC bodies is determined by measuring the b-value of weather-exposed molded bodies according to DIN 6167 with the type of light D65/10. The below-described PVC profile formulations are processed in the manner described hereinafter and are subsequently examined for evaluating their weatherability.

Processing:

The components of the formulation as well as PVC are mixed in a commercially available heating/cooling mixer up to a preparation temperature of 120° C. and are subsequently cooled to 40° C. The resultant dry blend is then extruded by means of an extruder to obtain sections.

Weather exposure is carried out in the manner described hereinafter.

The extrudates obtained according to the above-described method are cut into pieces having a size of 1.5×1.5 cm and are exposed to natural weather conditions over a total period of 3 years. At intervals of 4 months, the samples are removed from the weathering system and the color values of the test pieces are determined. The yellow value (b-value) of the samples is, in particular, measured according to DIN 6167 with a standard light type D 65/170 in response to the weathering duration.

Weather exposure was performed in the South of France (region: 6°, 43 degrees north) under the following conditions:

angle of inclination: 45° orientation: south

The bubbling intensity was evaluated with the help of prepared Mathis strips. To this end, an extrudate which had been prepared according to the above method was heat-treated in a Mathis furnace at 200° C. With such a thermal load on the material, stainings are observed on the one hand and bubbles are increasingly formed with an increasing duration on the other hand, the bubbles being caused by $CO_2$ and the crystallization water of hydrotalcite. The number of bubbles which can be found on one square centimeter of a Mathis strip after 25 minutes is determined as a measure of the bubbling intensity.

Moreover, the size of the bubbles is estimated in this method. Bubbles having a diameter size of up to 1 mm are classified as "small", bubbles of up to 3 mm as "mean" and bubbles greater than 3 mm as "large". It has been found that under this criterion the bubbling intensity of different stabilizers, for instance of different hydrotalcite types, can be judged quite well.

The HCl value according to DIN VDE 0472 part 614 is determined as a stabilization measure (Congo red test).

As can be learnt from Table 1, the initial color in the inventive Example B1 is improved in comparison with the non-inventive Comparative Examples VB1 to VB3. With an increasingly used amount of $Ca_4Al_2(OH)_{12}HPO_3 \cdot 3H_2O$, the yellow value of the extrudates continues to decrease, reaching the minimum b-value at a hydrotalcite/$Ca_4Al_2(OH)_{12}HPO_3 \cdot 3H_2O$ ratio of 1:1. The yellow value of VB4 and B5 are the same at a ratio of 1:1. As can be gathered from Table 2, a further increase in the used amount leads to undesirably low stabilization characteristics.

During weather exposure the yellow value of both the inventive Examples B1 to B5 and the Comparative

| Formulations 1 | | | | | | | | | |
|---|---|---|---|---|---|---|---|---|---|
|  | VB1 | VB2 | VB3 | VB4 | B1 | B2 | B3 | B4 | B5 |
| S-PVC K-value 68 | 100 | 100 | 100 | 100 | 100 | 100 | 100 | 100 | 100 |
| impact strength enhancer[1] | 7 | 7 | 7 | 7 | 7 | 7 | 7 | 7 | 7 |
| chalk | 5 | 5 | 5 | 5 | 5 | 5 | 5 | 5 | 5 |
| TiO$_2$ | 4 | 4 | 4 | 4 | 4 | 4 | 4 | 4 | 4 |
| distearyl phthalate | 0.6 | 0.6 | 0.6 | 0.6 | 0.6 | 0.6 | 0.6 | 0.6 | 0.6 |
| bisphenol A | 0.2 | 0.2 | 0.2 | 0.2 | 0.2 | 0.2 | 0.2 | 0.2 | 0.2 |
| paraffin wax | 0.2 | 0.2 | 0.2 | 0.2 | 0.2 | 0.2 | 0.2 | 0.2 | 0.2 |
| benzyl stearoyl methane | 0.2 | 0.2 | 0.2 | 0.2 | 0.2 | 0.2 | 0.2 | 0.2 | 0.2 |
| calcium acetyl-acetonate | 0.2 | 0.2 | 0.2 | 0.2 | 0.2 | 0.2 | 0.2 | 0.2 | 0.2 |
| $Ca_4Al_2(OH)_{12}HPO_3 \cdot 3H_2O$ | — | — | 0.1 | 1.0 | 0.1 | 0.2 | 0.3 | 0.4 | 0.5 |
| hydrotalcite[2] | 1.0 | 1.0 | 0.9 | — | 0.9 | 0.8 | 0.7 | 0.6 | 0.5 |
| theic[3] | 0.2 | — | — | 0.2 | 0.2 | 0.2 | 0.2 | 0.2 | 0.2 |
| zinc stearate | 0.8 | 0.8 | 0.8 | 0.8 | 0.8 | 0.8 | 0.8 | 0.8 | 0.8 |

[1]BA/MMA graft copolymer
[2]Alkamizer 1 (trade name)
[3]tris-(2-hydroxyethyl)isocyanurate Table 1 shows the yellow values (b-value) in response to the weathering duration.

TABLE 1

| Yellow values of formulations 1 | | | | | | | | | |
|---|---|---|---|---|---|---|---|---|---|
| number of months | 0 | 4 | 8 | 12 | 16 | 20 | 24 | 28 | 32 |
| b-value VB1 | 3.6 | 4.9 | 6.5 | 8.3 | 9.6 | 9.9 | 9.2 | 8.1 | 7.4 |
| b-value VB2 | 4.2 | 5.3 | 7.4 | 9.9 | 11.3 | 12.7 | 14.2 | 12.4 | 11.6 |
| b-value VB3 | 4.0 | 5.3 | 5.9 | 7.6 | 10.3 | 10.5 | 9.7 | 9.6 | 8.5 |
| b-value VB4 | 2.7 | 3.5 | 5.3 | 6.2 | 7.6 | 8.9 | 8.7 | 7.4 | 7.4 |
| b-value B1 | 3.4 | 3.8 | 4.3 | 5.8 | 6.3 | 6.9 | 7.9 | 6.3 | 6.0 |
| b-value B2 | 3.3 | 3.6 | 4.0 | 5.1 | 6.8 | 6.7 | 5.7 | 5.2 | 4.9 |
| b-value B3 | 3.0 | 3.6 | 3.9 | 4.7 | 5.4 | 6.3 | 6.1 | 5.7 | 5.1 |
| b-value B4 | 2.8 | 3.2 | 3.9 | 4.9 | 5.8 | 7.1 | 6.2 | 6.9 | 5.3 |
| b-value B5 | 2.7 | 3.6 | 3.7 | 5.6 | 5.3 | 6.4 | 7.2 | 6.3 | 5.7 |

TABLE 2

| Number and type of bubbles and HCl value of formulation 1 | | | | | | | | | |
|---|---|---|---|---|---|---|---|---|---|
|  | VB1 | VB2 | VB3 | VB4 | B1 | B2 | B3 | B4 | B5 |
| number of bubbles | 6 | 27 | 24 | none | 23 | 20 | 14 | 12 | 8 |
| type of bubbles | mean | mean | small | none | small | small | small | small | small |
| HCl values | 35 | 32 | 33 | 26 | 36 | 36 | 34 | 34 | 33 |

Examples BV1 to VB4 is increasing. The Comparative Examples VB1 to VB4 show a clearly steeper rise than the inventive Examples B1 to B5. The rise in the yellow value after weather exposure is clearly reduced by a 10% substitution of $Ca_4Al_2(OH)_{12}HPO_3 \cdot 3H_2O$ for hydrotalcite. After 16 months, i.e. half the weathering period, the inventive examples show distinctly smaller color changes with respect to the initial color than do the comparative examples.

As described above, the bubbles which can be found on one square centimeter in a Mathis strip at 25 min are counted as a measure of bubbling. As can be learnt from Table 2, the bubbling tendency considerably decreases with an increasing amount of $Ca_4Al_2(OH)_{12}HPO_3 \cdot 3H_2O$. Such a reduced bubble formation in the Mathis strip means a distinct improvement of the processing reliability for PVC molding compositions.

The preparations described in formulations 2 will explain the invention in detail.

| Formulations 2 | | | | | | |
|---|---|---|---|---|---|---|
|  | B6 | B7 | B8 | VB5 | B9 | B10 |
| S-PVC K-value 68 | 100 | 100 | 100 | 100 | 100 | 100 |
| impact strength enhancer[1] | 7 | 7 | 7 | 7 | 7 | 7 |
| chalk | 5 | 5 | 5 | 5 | 5 | 5 |
| TiO$_2$ | 4 | 4 | 4 | 4 | 4 | 4 |
| distearyl phthalate | 0.6 | 0.6 | 0.6 | 0.6 | 0.6 | 0.6 |
| bisphenol A | 0.2 | 0.2 | 0.2 | 0.2 | 0.2 | 0.2 |
| paraffin wax | 0.2 | 0.2 | 0.2 | 0.2 | 0.2 | 0.2 |
| benzyl stearoyl methane | 0.2 | 0.2 | 0.2 | 0.2 | 0.2 | 0.2 |

-continued

Formulations 2

|  | B6 | B7 | B8 | VB5 | B9 | B10 |
|---|---|---|---|---|---|---|
| calcium acetylacetonate | 0.2 | 0.2 | 0.2 | 0.2 | 0.2 | 0.2 |
| $Ca_4Al_2(OH)_{12}$ $HPO_3 \cdot 3H_2O$ | — | — | 0.15 | — | 0.2 | 0.1 |
| $Ca_4Al_2(OH)_{12}$ (fumarate)$\cdot 3H_2O$ | 0.1 | 0.3 | 0.15 | — | — | 0.1 |
| hydrotalcite[2] | 0.9 | 0.7 | 0.7 | 1.0 | 0.8 | 0.8 |
| theic[3] | 0.2 | 0.2 | 0.2 | — | — | — |
| polyol TMP[4] | — | — | — | 0.2 | 0.2 | 0.2 |
| zinc stearate | 0.8 | 0.8 | 0.8 | 0.8 | 0.8 | 0.8 |

[1] BA/MMA graft copolymer
[2] Alkamizer 1 (trade name)
[3] tris-(2-hydroxyethyl)isocyanurate
[4] trimethylol propane Table 3 shows the yellow values (b-value) in response to the weathering duration.

TABLE 3

Yellow values of formulations 2

| number of months | 0 | 4 | 8 | 12 | 16 | 20 | 24 | 28 | 32 |
|---|---|---|---|---|---|---|---|---|---|
| b-value B6 | 3.3 | 4.1 | 4.5 | 6.4 | 6.6 | 7.2 | 7.7 | 5.9 | 6.3 |
| b-value B7 | 2.8 | 4.1 | 5.4 | 6.2 | 7.1 | 8.0 | 6.5 | 5.7 | 5.5 |
| b-value B8 | 3.0 | 3.8 | 4.0 | 5.1 | 6.8 | 7.6 | 7.0 | 5.4 | 5.9 |
| b-value VB5 | 3.6 | 5.4 | 7.0 | 8.1 | 10.7 | 9.2 | 9.1 | 8.3 | 6.3 |
| b-value B9 | 3.3 | 4.1 | 5.2 | 6.3 | 6.7 | 7.1 | 5.4 | 6.0 | 5.8 |
| b-value B10 | 3.1 | 3.6 | 4.3 | 5.1 | 6.8 | 6.7 | 5.7 | 5.2 | 4.6 |

TABLE 4

Number and type of bubbles and HCl value of formulations 2

|  | B6 | B7 | B8 | VB5 | B9 | B10 |
|---|---|---|---|---|---|---|
| Number of bubbles | 19 | 6 | 8 | 33 | 19 | 23 |
| type of bubbles | small/mean | small | small | mean | small | small |
| HCl values | 37 | 35 | 35 | 34 | 34 | 34 |

Examples B6 to B8 show that the same positive effects as with calcium/aluminum/hydroxy phosphites can be achieved with calcium/aluminum/hydroxy carboxylates. The initial colors are considerably improved in comparison with VB1 or VB5. The rise in the yellow values of Examples B6 to B8 is lower than in the Comparative Examples VB1 to VB4—also after weather exposure. Moreover, when $Ca_4Al_2(OH)_{12}$(fumarate)$\cdot 3H_2O$ is used, less bubbles are found. Stabilization is not impaired by the use of such amounts.

In Examples B9 and B10 TMP has been compared with Comparative Examples VB5 and VB3 as a further polyol. As becomes also apparent here, the combination of polyol with $Ca_4Al_2(OH)_{12}$(fumarate)$\cdot 3H_2O$ and/or $Ca_4Al_2(OH)_{12}HPO_3 \cdot 3H_2O$ and hydrotalcite shows considerably improved weathering characteristics and reduced bubbling.

We claim:

1. Stabilizer composition for halogen-containing thermoplastic resins, comprising
    (a) at least one natural or synthetic hydrotalcite which is optionally surface-modified,
    (b) at least one basic calcium-aluminum-hydroxy compound selected from
        (b1) basic calcium-aluminum-hydroxy-phosphites represented by the general formula (I)

$$Ca_xAl_2(OH)_{2(x+3-y)}(HPO_3)_y \cdot mH_2O \qquad (I)$$

wherein
$2 \leq x \leq 12$
$2x+5/2 > y > 02$
$0 \leq m \leq 12$,
except for y=1 when $2 \leq x \leq 8$;
and/or
    (b2) basic calcium-aluminum-hydroxy-carboxylates represented by the general formula (II)

$$Ca_xAl_2(OH)_{[(2x+6)-y]}A_{y/n}^{n-} \cdot mH_2O \qquad (II)$$

wherein
$2 \leq x \leq 12$,
$2x+5/2 > y > 02$
$0 \leq m \leq 12$,
$1 \leq n \leq 8$, and
$A^{n-}$ represents an aliphatic saturated, unsaturated, straight-chain or branched mono- or polyfunctional carboxylic acid anion having 1 to 22 carbon atoms or an aromatic or heteroaromatic mono- or polyfunctional carboxylic acid anion having 6 to 20 carbon atoms, or combinations thereof, except for y=1, when $2 \leq x \leq 8$; and
    (c) at least one polyol and/or at least one hydroxyl group-containing isocyanurate,
wherein said stabilizer composition does not contain ethylene/vinylacetate-copolymer hydrolysate.

2. The stabilizer composition according to claim 1, characterized in that it contains said component (a) in an amount of from 0.01 to 2 parts by weight, based on 100 parts by weight of the halogen-containing thermoplastic resin.

3. The stabilizer composition according to claim 1 or 2, characterized in that it contains said component (b) in an amount of from 0.01 to 2 parts by weight, based on 100 parts by weight of the halogen-containing thermoplastic resin.

4. The stabilizer composition according to any one of claims 1 to 3, characterized in that it contains said component (c) in an amount of from 0.01 to 2.5 parts by weight, based on 100 parts by weight of the halogen-containing thermoplastic resin.

5. The stabilizer composition according to any one of claims 1 to 4, characterized in that the polyol is selected from polyols having 2 to 32 C atoms and 2 to 12 hydroxyl groups.

6. The stabilizer composition according to any one of claims 1 to 5, characterized in that the hydroxyl group-containing isocyanurate is selected from compounds represented by the general formula (III)

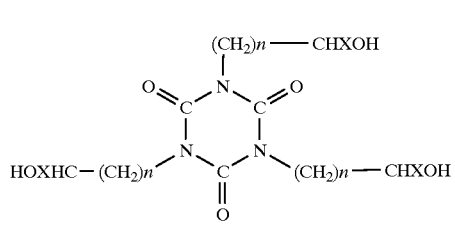

wherein groups X and indices n are respectively the same or different, and n is an integer of 0 to 5 and X represents a hydrogen atom or a straight-chain or branched alkyl group having 1 to 6 carbon atoms, with at least one index being n=0.

* * * * *

UNITED STATES PATENT AND TRADEMARK OFFICE
CERTIFICATE OF CORRECTION

PATENT NO. : 5,938,977
DATED : August 17, 1999
INVENTOR(S) : Michael Rosenthal et al.

It is certified that error appears in the above-identified patent and that said Letters Patent is hereby corrected as shown below:

<u>Title page,</u>
Item [56], under "U.S. PATENT DOCUMENTS", delete lines 1-3, and insert the following:

| | | | |
|---|---|---|---|
| -- 4,751,261 | 6/1988 | Miyata et al. ……… | |
| 4,963,608 | 10/1990 | Kuneida et al. ……… | |
| 5,356,982 | 10/1994 | Razvan et al. ……… | |
| 5,534,566 | 7/1996 | Wehner et al. ……… | 524/27 |
| 5,859,102 | 1/1999 | Pfaendner et al. ……… | 524/117 |

FOREIGN PATENT DOCUMENTS

| | | |
|---|---|---|
| 424 572 A1 | 10/1989 | European Pat. Off. |
| 432 495 | 11/1990 | European Pat. Off. -- |

Signed and Sealed this

Nineteenth Day of March, 2002

Attest:

JAMES E. ROGAN
*Attesting Officer*     *Director of the United States Patent and Trademark Office*